(12) United States Patent
Hang et al.

(10) Patent No.: US 11,988,753 B2
(45) Date of Patent: May 21, 2024

(54) GNSS-RECEIVER INTERFERENCE DETECTION USING DEEP LEARNING

(71) Applicant: NovAtel Inc., Calgary (CA)

(72) Inventors: Robert Hang, Calgary (CA); Joyce Chidinma Chidiadi, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 17/982,021

(22) Filed: Nov. 7, 2022

(65) Prior Publication Data

US 2023/0068027 A1   Mar. 2, 2023

Related U.S. Application Data

(63) Continuation of application No. 16/860,536, filed on Apr. 28, 2020, now abandoned.

(51) Int. Cl.

| | | |
|---|---|---|
| G06N 3/04 | (2023.01) | |
| G01S 19/21 | (2010.01) | |
| G01S 19/37 | (2010.01) | |
| G06N 3/044 | (2023.01) | |
| G06N 3/063 | (2023.01) | |
| G06T 7/00 | (2017.01) | |
| G06V 10/44 | (2022.01) | |

(52) U.S. Cl.
CPC .............. *G01S 19/21* (2013.01); *G01S 19/37* (2013.01); *G06N 3/044* (2023.01); *G06N 3/063* (2013.01); *G06T 7/0002* (2013.01); *G06V 10/454* (2022.01); *G06T 2207/20084* (2013.01)

(58) Field of Classification Search
CPC ........ G06N 3/084; G06N 3/0454; G06N 3/08; G06N 20/00; G01S 19/07; G01S 13/953; G01S 7/417; G01W 1/10; G05D 1/0088
See application file for complete search history.

(56) References Cited

U.S. PATENT DOCUMENTS

| | | | |
|---|---|---|---|
| 11,181,634 B1* | 11/2021 | Lue | .................. G06N 3/045 |
| 2018/0024248 A1* | 1/2018 | Orejas | .................. G06N 3/08 |
| | | | 342/357.44 |

FOREIGN PATENT DOCUMENTS

| | | |
|---|---|---|
| CN | 109188470 | 1/2019 |
| CN | 110231634 | 9/2019 |
| CN | 110515096 | 11/2019 |
| CN | 111399002 | 7/2020 |
| CN | 111783558 | 10/2020 |

OTHER PUBLICATIONS

European Search Report dated Sep. 16, 2021 for European Application No. 21170985.2 for NovAtel Inc., 7 pages.

(Continued)

*Primary Examiner* — Phuoc H Doan
(74) *Attorney, Agent, or Firm* — Cesari and McKenna, LLP (57) ABSTRACT

Systems and methods are described for classification of interference for GNSS receivers. One or more neural networks are utilized to classify RF signal data received by a GNSS receiver. The classification associates the RF signal data with an RF environment. Appropriate interference mitigation techniques can be implemented by the receiver based on the classification.

20 Claims, 4 Drawing Sheets

(56) References Cited

OTHER PUBLICATIONS

"Detecting Interference and Classification in Global Navigation Satellite Systems Based on Machine Learning Techniques," Masters Thesis by Iman Ebrahimi Mehr for Politecnico Di Torino, Apr. 2021, 96 pages.

Phelts, Robert Eric, "Multicorrelator Techniques for Robust Mitigation of Threats to GPS Signal Quality," Doctor of Philosophy Thesis submitted Jun. 2001 to Stanford University, 345 pages.

Knocklein, Oliver, "Classification Using Neural Networks," *Towards Data Science*, Une 5, 2019, 9 pages.

Kamel, "Context Aware High Dynamics GNSS-INS for Interference Mitigation," Doctor of Philosophy Thesis submitted Aug. 2011 to University of Calgary, 218 pages.

\* cited by examiner

GNSS-RECEIVER INTERFERENCE DETECTION USING DEEP LEARNING

CROSS-REFERENCE TO RELATED APPLICATIONS

The present application is a continuation of commonly assigned copending U.S. patent application Ser. No. 16/860,536, which was filed on Apr. 28, 2020, by Robert Hang, et al., for GNSS-RECEIVER INTERFERENCE DETECTION USING DEEP LEARNING, which is hereby incorporated by reference.

BACKGROUND

Technical Field

The present disclosure generally relates to mitigation of radio frequency (RF) interference in global satellite system (GNSS) receivers. The present disclosure more particularly relates to using neural networks for classification of radio frequency (RF) interference environments experienced by GNSS receivers.

Description of Related Art

A fundamental and crucial step in dealing with radio frequency (RF) interference experienced by a global navigation satellite system (GNSS) receiver is the ability to detect interference in a consistent and accurate way. If interference is reported by the detector when there is no actual interference, the receiver would attempt to estimate the interference parameters of non-existent interference and would apply a mitigation method when none is needed thereby causing unnecessary performance degradation. Conversely, if interference is present but it is not detected, the receiver will not apply any mitigation method and will operate in a degraded fashion or simply not operate at all, depending on the severity of the interference.

Prior techniques of addressing GNSS receiver interference have utilized two algorithms for interference detection: spectral analysis and statistical analysis. Spectral analysis can be well suited for detection of in-band (IB) interference, i.e., interference which frequency components are within the passband of the RF section ("deck"), while statistical analysis can be well suited for detection of out-of-band (OOB) interference, i.e., interference which frequency components are outside the RF deck passband. Variants and refinements of these methods can be used—albeit with not inconsiderable effort and individualized algorithmic construction—to correctly detect interference corner cases.

A significant drawback of such approaches is the two detection algorithms (spectral and statistical analysis) must be concurrently running, possibly along with their variants, leading to complexity in terms of operating them and making sure that their concurrent use does not result in conflicting detection outcomes. These algorithms are often referred to as rule-based methods because they follow explicit steps described by the algorithms to achieve the desired detection performance.

Using such prior techniques, when a new type of interference is to be recognized at the GNSS receiver, that type of interference must first be characterized and then a new detector (e.g., a variant of the spectral or statistical algorithms) would need to be devised specifically for that newly characterized interference. This new detector would then need to be operated in addition to the previous two algorithms and their variants/refinements. Overall, this makes the detection more complex, harder to maintain, and more complex to ensure correct performance, not to mention the significant work involved in devising the new detection algorithm.

SUMMARY

An aspect of the present disclosure is directed to classification of interference for GNSS receivers, e.g., GPS, GLONASS, and the like. One or more neural networks are utilized to classify RF signal data received by a GNSS receiver. The classification associates the RF signal data with an RF environment. Appropriate interference mitigation techniques can be implemented by the receiver based on the classification.

An aspect of the present disclosure is directed to a GNSS processor architecture for processing GNSS receiver signal data, the processing architecture including: a processor; and a memory unit in communication with the processor via a communication infrastructure (e.g., bus) and storing processor-readable instructions; wherein, when executed by the processor, the processor-readable instructions cause the processor to: receive RF signal data associated with a class of RF environment; provide the RF signal data to a neural network for classification of the RF signal data as belonging to a pre-defined type of RF environment; using the neural network, classify the RF signal data as belonging to a pre-defined type of RF environment; and apply an interference mitigation technique corresponding to the type of RF environment that has been classified.

For the GNSS processor architecture, the neural network can include or be composed of an artificial neural network (ANN). For the GNSS processor architecture, the neural network can include or be composed of a convolutional neural network (CNN). For the GNSS processor architecture, the RF signal data can be classified as belonging to one of three RF environments, no interference, in-band interference, and out-of-band interference. For the GNSS processor architecture, the neural network can include a first layer used to process input images, e.g., power spectral density (PSD) images. Such PSD images may be (but are not necessarily) configured in a 128×128 pixels format. For the GNSS processor architecture, when the neural network includes a CNN, the CNN can include eight convolutional layers configured to process the PSD images.

When a CNN is used for the GNSS processor architecture, a 6×6 kernel can be used for feature extraction using max pooling. When a CNN is used for the GNSS processor architecture, a last convolution layer can be connected to a fully-connected layer with 32 neurons. For the GNSS processor architecture, the neural network can include an output layer having three (3) neurons configured to output classification determinations of one of three interference environments, using a soft max activation function. For the GNSS processor architecture, the neural network can include or be composed of a recurrent neural network (RNN). Such a RNN can include or be composed of a Long Short-Term Memory (LSTM) RNN. For the GNSS processor architecture, the neural network can include or be composed of an autoencoder. For the GNSS processor architecture, the neural network can include or be composed of a Restricted Boltzmann Machine (RBM).

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An aspect of the present disclosure is directed to distinguishing different types of RF environments seen by a GNSS receiver as different classes of interference, and then using a neural network to classify interference at the receiver into one or more of these RF environment classes (and thereby detect interference at the receiver). For example, an interference-free RF environment can be considered a class to be detected just like an RF environment with interference. Interference environments can be further classified into in-band (IB) of out-of-band (OOB) interference. Some classes can then be split to create new classes, e.g., weak IB and strong IB interference. Once all types of interference— or, interference environments—have been identified, the neural network can be used to classify them when experienced by a GNSS receiver. Such a neural network is trained and validated using the data associated with defined or pre-defined classes of RF interference experienced by a GNSS receiver.

The data that are associated with the interference classes can be of any receiver metric that well characterizes the classes, e.g., PSD, carrier-to-noise ratio (C/No), pseudo-noise tracking error, estimated positioning error, etc. Once trained to the required performance level, the neural network is used in a prediction mode where receiver input metrics can then be processed, with the neural network outputting results for each of the classes. The class with the highest output metric is then selected (classified) as the detected RF environment. In the situation where a new type of interference needs to be supported, this new type of interference is characterized (e.g., PSD with that new type of interference), the associated data is created, and then the neural network is re-trained/re-tuned against that new data and the data of all previously known interference types. This is in contrast with prior rule-based algorithms for which characterization of the new interference requires creation of a new rule, i.e., creation of a new detector algorithm, representing a significant undertaking.

Figure 1:
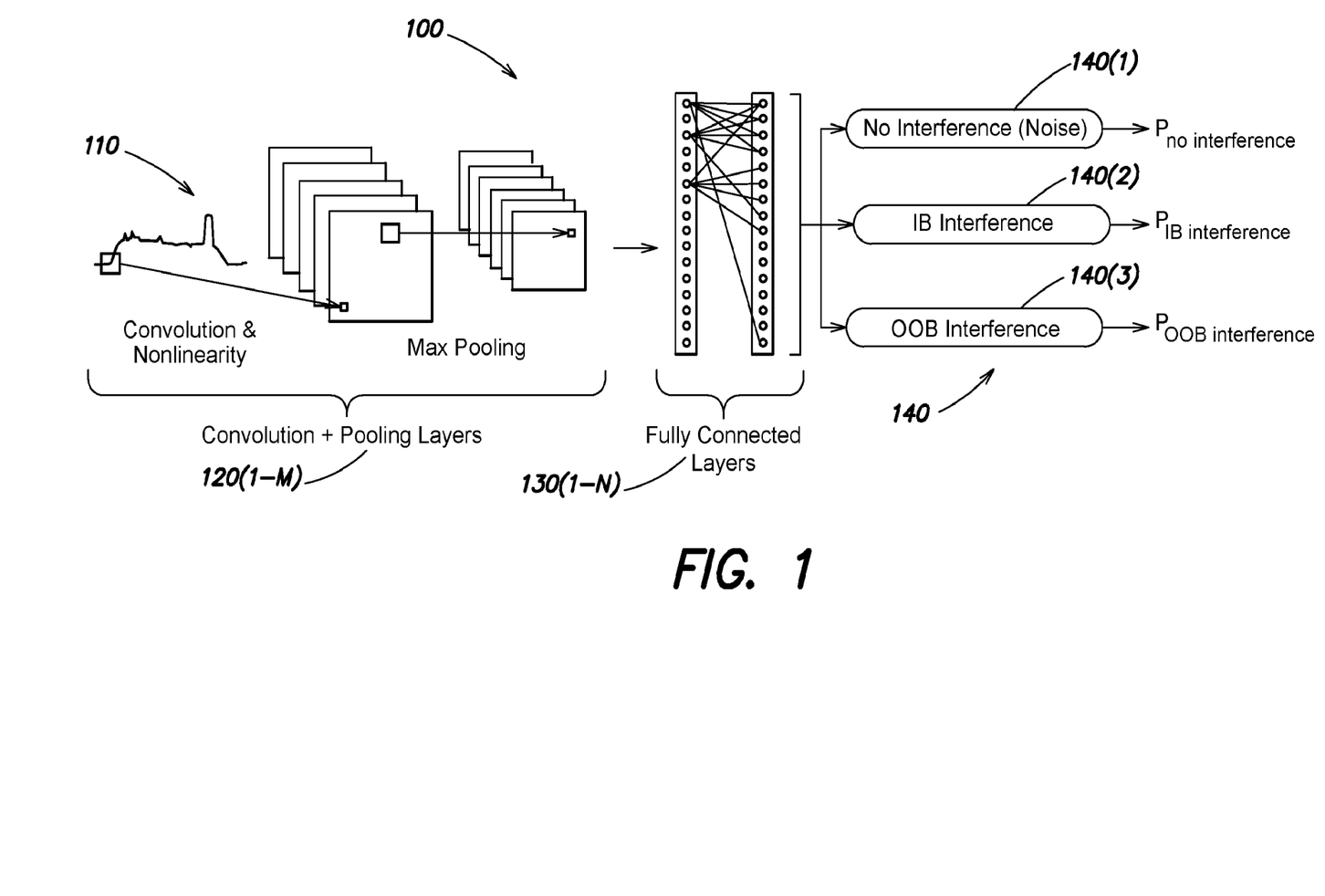
FIG. 1 depicts a diagram of an example of a convolutional neural network (CNN) architecture embodiment of the present disclosure.

An aspect of the present disclosure is directed to using artificial neural networks (which may variously be referred to as "ANNs," "NNs," or "neural networks") for the classification and detection of interference in or by GNSS receivers. A neural network, or group of neural networks, is utilized as a detector that is capable of detecting any type of interference, instead of relying on several rule-based algorithms (e.g., spectral analysis, statistical analysis, and their variants). A neural network can perform interference detection by classification based on one or more characteristics. For example, a neural network can classify a type of interference from power spectral densities (PSD) values directly. Suitable types of neural networks that may be used within the scope of the present disclosure include, but are not limited to, ANNs, convolutional neural networks ("CNNs"), and recurrent neural networks ("RNNs"), among others. FIG. 1 depicts a diagram of an example of an ANN architecture 100 embodiment of the present disclosure. As shown, ANN 100 includes a number of input images, e.g., power spectral densities (PSDs) of GNSS signals received at a receiver. The pixel values of one or more input images are provided to an input layer of a fully-connected section that also has an output layer and a number (N) of hidden layers.

In exemplary embodiments, convolutional neural networks (CNNs) can be used as detector. Working as image classifiers, CNNs can use PSDs as images. By virtue of processing images, CNNs have the advantage that they can readily be used for visual aid such as highlighting the zone of the spectrum where interference is located. FIG. 1 depicts a diagram of an example of a CNN architecture 200 in accordance with the present disclosure.

As shown in FIG. 1, CNN 100 includes an input image 110, e.g., a PSD (as shown), a convolutional and pooling section 120 with a number of convolutional and pooling layers 120(1-M), a fully-connected section 130 with a number of fully connected layers 130 (1-N), and an output 140 section. The output section includes a number of nodes, e.g., three, for classification. In exemplary embodiments, a Softmax function may be used for the classification. The convolutional and pooling section 120 can include one or more convolutional layers and one or more pooling layers. A convolutional layer can be cascaded with another convolutional layer or a pooling layer. Similarly, a pooling layer can be cascaded with a convolutional layer or a pooling layer or may be connected to a fully-connected layer, e.g., of the fully-connected section 130.

In operation of CNN 100, the convolutional and pooling section 120 implements a convolutional 2D filter (kernel) for feature extraction of an input, e.g., input PSD image. Max pooling reduces the spatial size of the convolved feature(s). After the convolution and pooling operations are performed by the convolution and pooling section, the fully-connected section 130 is used to learn non-linear combinations of the features (e.g., high-level features) that are represented by the output of the convolution and pooling section 120. A flattening layer can be used for some applications for the fully-connected section 130. The output section 140 receives the output of the fully-connected section 130 and then classifies the input images, e.g., PSDs, accordingly. As a preliminary step, one or more appropriate data sets can be utilized for training and validation purposes for the CNN 100.

The CNN 100 may have any type of suitable CNN configuration, e.g., LeNet, AlexNet, VGG, VGGNet, GoogLeNet, ResNet, ZFNet, XCeption CNN, Inception v3 or v4, or the like. In some applications, a dilated convolution 2D filter may be used, e.g., to reduce computation costs or accommodate a certain computation performance level. In some applications, valid padding or same padding may be used for the convolution layer(s), e.g., when it is desired to increase or keep same the dimensionality of an input image. In exemplary embodiments, different types of neural networks can be combined, e.g., T cascaded, for detection. For example, an ANN can be followed by a CNN if some refinements are needed or desired, etc.

Figure 2:
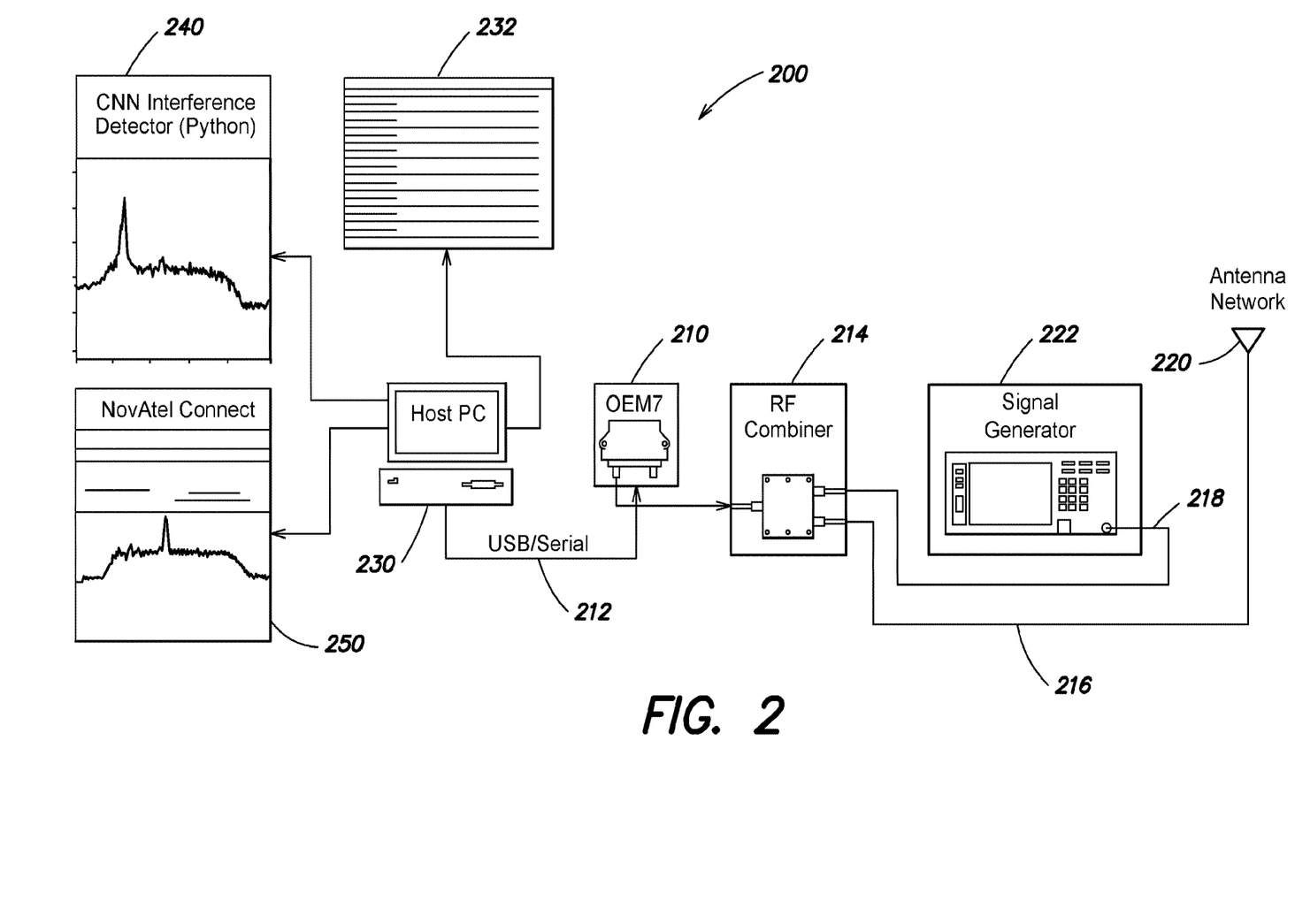
FIG. 2 depicts a diagram of an implemented interference classification and verification system in accordance with the present disclosure.

FIG. 2 depicts a diagram of an implemented interference classification and verification system 200 in accordance with the present disclosure. The system 200 includes a GNSS receiver 210, connected to an antenna 220 and a personal computer (PC) 230. A signal generator 222 was used to add various noise and signal profiles to simulate different RF environments for classification. The prototype embodiment 200 was implemented using a main Python script 232 resident on PC 230. The PC 230 also implemented NovAtel Connect™ as a graphic user interface (GUI). NovAtel Connect™ is a windows-based GUI that allows a user to access a NovAtel receiver's many features without the need to use a terminal emulator or to write special software and allows the user to easily communicate and configure the receiver via serial port, USB or ethernet connection using a PC running the Windows 7 or Windows 10 operating system. The Python script 232 consisted of a block configured for retrieving power spectral density (PSD) logs from a receiver (NovAtel OEM7 receiver) and performing detection of three classes of radio-frequency (RF) environments: no interference, in-band (TB) interference and out-of-band (OOB) interference all in real-time.

For the implemented prototype embodiment, a first layer was used to input power spectral density (PSD) images, which were in a 128×128 pixels format. Eight (8) convolutional layers then were used to process the images, using a 6×6 kernel (window filter) for feature extraction using max pooling. The last convolution layer then was connected to a fully-connected layer with 32 neurons, which used the ReLU activation function. An output layer of three (3) neurons then was used to output classification determinations of one of three interference environments, using a soft max activation function.

For training purposes, 26500 PSD images were used; 14000 were used for validation. The PSD images were labeled with the following labels: (i) type of interference, (ii) frequency, (iii) power level, and (iv) bandwidth of interference. An accuracy of detection of 98.80% was obtained during the off-line validation of the deep learning-based interference detector against captured PSD logs.

Figure 3:
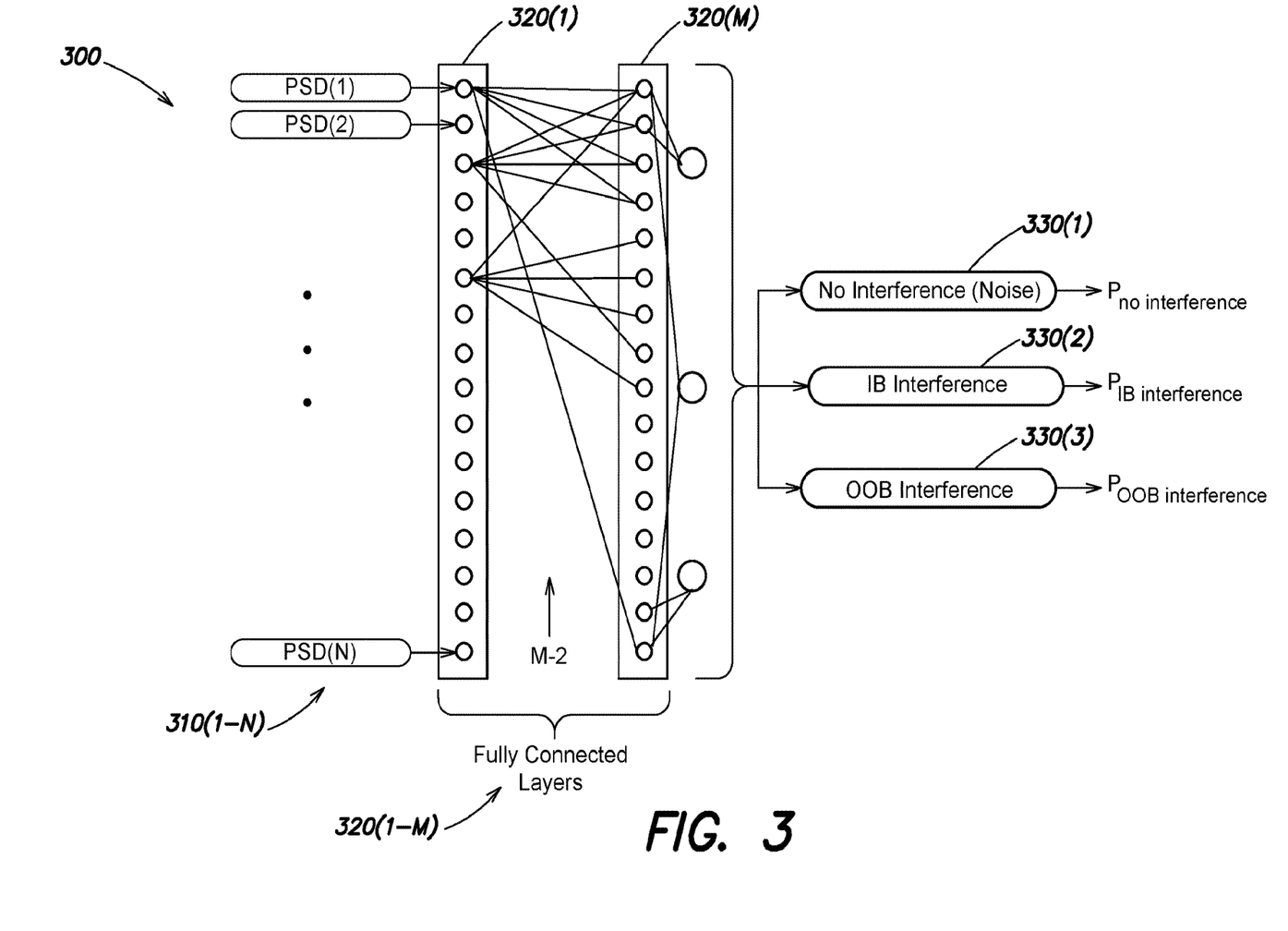
FIG. 3 depicts a diagram of an example of an artificial neural network (ANN) architecture embodiment of the present disclosure.

FIG. 3 depicts a diagram of an example of an ANN architecture 300 in accordance with an alternate embodiment of the present disclosure. As shown, ANN 300 receives and processes a number of input images 310(1-N), e.g., power spectral densities (PSDs) of GNSS signals received at or by a GNSS receiver. ANN 300 includes a fully-connected section 320 having a number (M) of fully-connected layers in a deep learning configuration. The fully-connected section 320 includes a number (M-2) of hidden layers and provides an output classification 330.

In operation, one or more input images, e.g., PSDs, are provided to the input layer of the fully-connected section 320 and then are processed by the number (M-2) of hidden layers. The last layer of the fully-connected section 320 performs classification of the input images, e.g., by using a Softmax activation function, determining which class the input image is most likely to be associated with.

Figure 4:
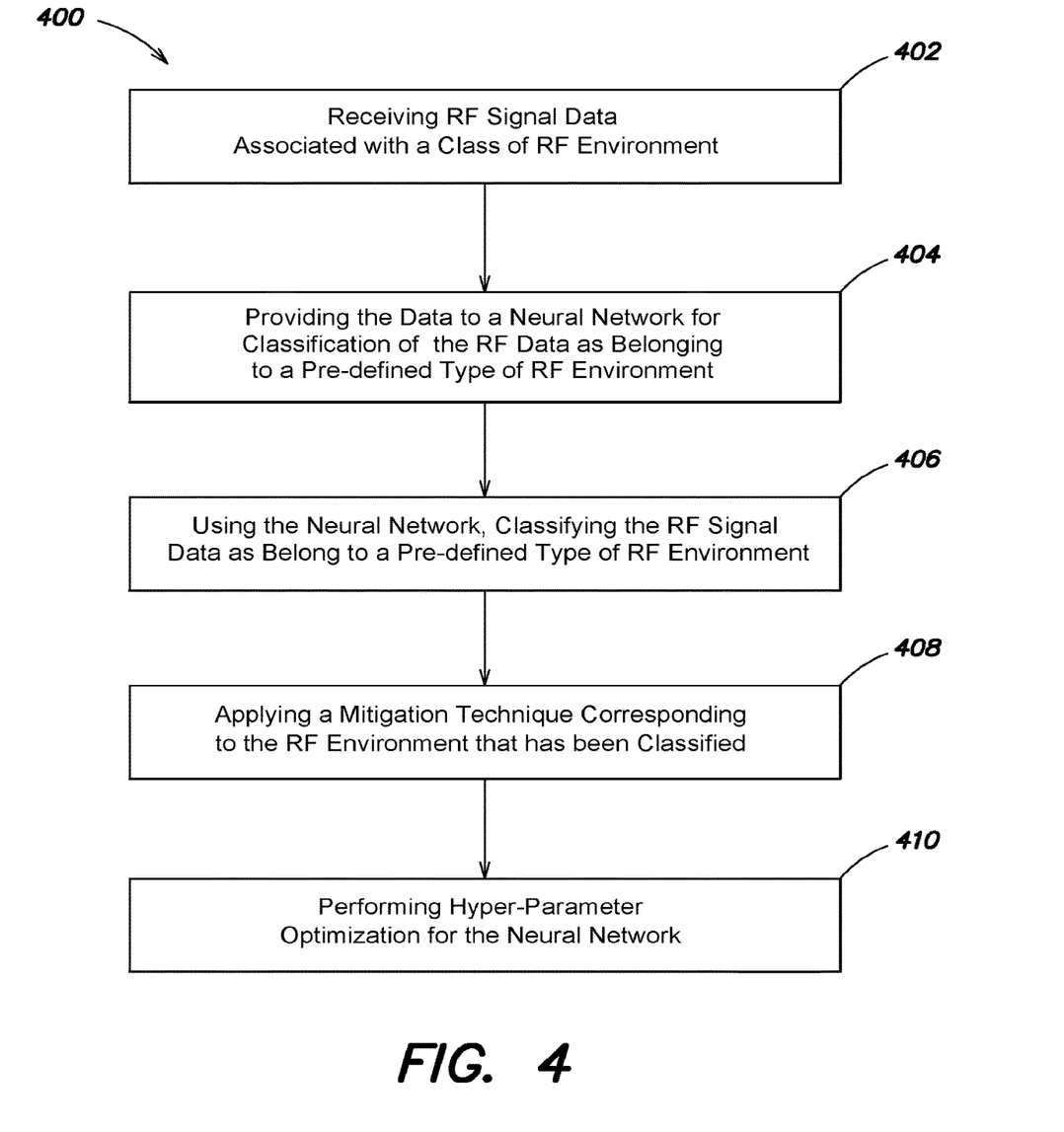
FIG. 4 depicts a block diagram of an example of a method of detecting and classifying interference in accordance with the present disclosure.

FIG. 4 depicts a block diagram of an example of an interference detection and classification method 400, in accordance with the present disclosure. For method 400, RF signal data can be received by a receiver, with the RF signal data being associated with a type or class of RF environment, as shown at 402. Non-limiting examples of such types or classes of RF environments include but are not limited to (i) interference-free, (ii) in-band (IB) interference, and (iii) out-of-band (OOB) interference. The RF signal data can be provided to a neural network, e.g., CNN 100 of FIG. 1, for classification of the data as belonging to a pre-defined type of RF environment, as shown at 404.

Continuing with the description of method 400, using the neural network, the type of RF environment of or associated with the RF signal data can be classified, as shown at 406. One or more mitigation techniques, e.g., application of a particular filter, can then be applied to the RF signal data or subsequent data based on or corresponding to the classification of the RF environment, as shown at 408. Exemplary mitigation techniques include, but are not limited to, implementing suitable filters, and/or applying controlled radiation pattern antenna (e.g., null-forming) for any type of interference but more so for interference that are at the same frequency as GNSS signals. Hyperparameters of the neural network can be tuned or optimized—at the training stage—for improved accuracy and/or computational efficiency, as shown at 410.

One of skill in the art will understand that each block or step shown and described for FIG. 4 can be implemented in suitable code as computer-readable instructions resident or stored in suitable memory, e.g., within GNSS receiver 310 of FIG. 3. The instructions can be implemented by a suitable processor, e.g., resident in GNSS receiver 310, that is/are connected to the memory, and when executed by the processor cause the processor to perform the functions shown and described for FIG. 4.

As noted above, hyperparameter tuning (hyperparameter optimization) of the deep-learning based detector may be employed to lead to higher detection accuracy. For a CNN, any suitably-sized filters or kernels (e.g., 2-by-2, 3-by-2, 3-by-3, 4-by-2, 4-by-3, 4-by-4, etc.) may be used for striding (kernel size). Any suitable pooling technique can be used, e.g., max pooling or average pooling can be used. Max pooling was used for the implemented embodiment and may be preferable for noise filtering. Any suitable cost (loss) function can be used, e.g., quadratic cost (a/k/a, mean squared error or MSE, maximum likelihood, or sum-squared error), cross-entropy cost, exponential cost, Hellinger distance, Kullback-Leibler divergence, etc.

Any suitable activation function can be used, e.g., rectified linear unit (ReLU), Softmax, etc. In exemplary embodiments, ReLU is used. Any suitable optimization (solver) algorithm can be used for a neural network. For example, various types of gradient descent algorithms can be used. In exemplary embodiments, a stochastic gradient descent (SGD) algorithm can be used. Hyperparameters that can be optimized in SGD include learning rate, momentum, decay, and Nesterov (which takes the value true or false depending on whether one wants to apply Nesterov momentum). Alternatively, or in conjunction, a root mean squared optimizer such as a root mean squared propagation (RMSProp) optimizer can be used. For some applications, an adaptive moment estimation (Adam) optimizer can be used.

Unless otherwise indicated, the neural networks and classification methods that have been discussed herein are implemented with a specially-configured computer system, e.g., a GNSS receiver, specifically configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system for the neural network(s) and classification method(s) may be or include a desktop computer or a portable computer, such as a laptop computer, a notebook computer, a tablet computer, a PDA, a smartphone, or part of a larger system, such a vehicle, appliance, and/or telephone system. Each computer system for the neural network(s)and classification may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, while the above description has been provided in the context of using CNNs and ANNs, other types of neural networks such as recurrent neural networks (RNNs) and Restricted Boltzmann Machines (RBMs) can be used within the scope of the present disclosure, as one skilled in the art will appreciate.

The Long Short-Term Memory (LSTM) variant or type of Recurrent Neural Network (RNN) can be used in the context of the present disclosure. An LSTM unit in RNN is composed of four main elements; the memory cell and three logistic gates (Read, Write and Forget gates). Manipulating these gates gives the RNN the ability to remember what it needs and forgets what is no longer useful for predicting a sequence. By stacking layers to create hierarchical feature representation of the input data which then feeds as input to the second layer, the next LSTM will blend the new input into its own internal state to produce an output. Stacking LSTM hidden layers will make the model deeper and allow for greater model complexity and probably leading to more accurate result.

RNNs can be used to detect certain types of time-varying interference such as sweeping interference in which frequency center changes over time i.e. successive PDS images show interference at different frequencies. Such sequence of frequencies could be detected by an RNN as its memory elements makes it suitable to store past information about PDSs that follow a certain pattern.

Another aspect of the present disclosure includes the use of unsupervised learning algorithms including Restricted Boltzmann Machines (RBMs) and autoencoders.

RBMs work well with unlabeled data such as images, videos and audio files. The weights of the neural network are adjusted in such a way that the RBM can extract the relationships among the input features and then determines which features are relevant to achieve the expected results. After training, the network will have the ability to reconstruct the input image. RBMs learn from data and "autoencode" their own structure in a stochastic way for more efficient dimensionality reduction which make them work better than the popular Autoencoders or the Principal Component Analysis (PCA) methods.

Once detection has been performed, e.g., by an RBM, another NN can be used to determine more parameters of the interference source such as frequency center, bandwidth, power, etc. For example, once an interference source has been detected (i.e., image classified) as in band (IB) by the detection NN, the estimation NN (e.g., provided by an NN used for regression) can be used to localize the interference within the image which means that the NN can estimate parameters such as center frequency, bandwidth, power level, etc. Most of these parameters are discrete (e.g., center frequency can take any values between 1550 MHz to 1590 MHz) so they do not lend themselves to being grouped into classes for detection hence the use of an regression NN (called estimation NN) for performing estimation after detection has been declared by the detection NN. Another reason for using two separate NNs, a detection NN and an estimation NN, is because for some classes such as strong out-of-band interference (OOB), PSDs are distorted in such way that it is not possible to estimate parameters such as center frequency and bandwidth. In that situation the estimation NN should not attempt to perform estimation if the detection NN detects such class.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type. The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A Global Navigation Satellite System (GNSS) processing architecture, the GNSS processing architecture comprising:
   a processor; and
   a memory unit in communication with the processor via a communication infrastructure and configured to store processor-readable instructions;
   wherein, when executed by the processor, the processor-readable instructions cause the processor to:
   receive signal data including one or more input metric values for one or more types of input parameters;
   provide the signal data to a neural network for classification of the signal data; and
   classify, using the neural network, the signal data as being of a particular type of interference environment of a plurality of different types of interference environments.

2. The GNSS processing architecture of claim 1, wherein the plurality of different types of interference environments include two or more of (1) an interference-free environment, (2) an in-band interference environment, and (3) an out-of-band interference environment.

3. The GNSS processing architecture of claim 1, wherein the neural network comprises one or more of an artificial neural network (ANN) and a convolutional neural network (CNN).

4. The GNSS processing architecture of claim 1, wherein the one or more types of input parameters is one or more of (1) a power spectral density parameter, (2) a carrier-to-noise ratio parameter, (3) a pseudo-noise tracking error parameter, or (4) an estimated positioning error parameter.

5. The GNSS processing architecture of claim 1, wherein the processor-readable instructions further cause the processor to estimate, after the classification of the signal data as being of the particular type of interference environment, a value for one or more additional types of input parameters.

6. The GNSS processing architecture of claim 5, wherein the one or more additional types of input parameters include one or more of (1) a frequency center parameter, (2) a bandwidth parameter, or (3) a power parameter.

7. The GNSS processing architecture of claim 6, wherein the processor-readable instructions further cause the processor to:
   select an interference mitigation technique assigned to the classification of the signal data as being of the particular type of interference environment and based on values for the one or more additional types of input parameters; and
   apply the selected interference mitigation technique.

8. The GNSS processing architecture of claim 1, wherein the processor-readable instructions further cause the processor to:
   select an interference mitigation technique assigned to the classification of the signal data as being of the particular type of interference environment; and
   apply the selected interference mitigation technique.

9. A method comprising:
   receiving, at a Global Navigation Satellite System (GNSS) processing architecture, signal data including one or more input metric values for one or more types of input parameters of a plurality of different input parameters,
   wherein the signal data is from one or more received GNSS signals;
   providing the signal data to a neural network for classification of the signal data; and
   classifying, using the neural network, the signal data as being of a particular type of interference environment of a plurality of different types of interference environments.

10. The method of claim 9, wherein the plurality of different types of interference environments include two or more of (1) an interference-free environment, (2) an in-band interference environment, and (3) an out-of-band interference environment.

11. The method of claim 9, wherein the neural network comprises one or more of an artificial neural network (ANN) and a convolutional neural network (CNN).

12. The method of claim 9, wherein the plurality of different input parameters includes at least two of a power spectral density parameter, a carrier-to-noise ratio parameter, a pseudo-noise tracking error parameter, or an estimated positioning error parameter.

13. The method of claim 9, further comprising estimating, after the classification of the signal data as being of the particular type of interference environment, a value for one or more additional types of input parameters.

14. The method of claim 13, wherein the one or more additional types of input parameters include one or more of (1) a frequency center parameter, (2) a bandwidth parameter, or (3) a power parameter.

15. The method of claim 14, further comprising:
   selecting an interference mitigation technique assigned to the classification of the signal data as being of the particular type of interference environment and based on values for the one or more additional types of input parameters; and applying the selected interference mitigation technique.

16. The method of claim 9, further comprising:

selecting an interference mitigation technique assigned to the classification of the signal data as being of the particular type of interference environment; and applying the selected interference mitigation technique.

17. A Global Navigation Satellite System (GNSS) receiver configured to:

receive signal data including one or more input metric values for one or more types of input parameters of a plurality of different types of input parameters, wherein the signal data is from one or more GNSS signals;

provide the signal data to a neural network for classification of the signal data; and classify, using the neural network, the signal data as being of a particular type of environment of a plurality of different types of environments, wherein the classification is used to identify a mitigation technique of a plurality of different mitigation techniques.

18. The GNSS receiver of claim 17, wherein the neural network comprises one or more of an artificial neural network (ANN) and a convolutional neural network (CNN).

19. The GNSS receiver of claim 17, wherein the plurality of different input parameters includes at least two of a power spectral density parameter, a carrier-to-noise ratio parameter, a pseudo-noise tracking error parameter, or an estimated positioning error parameter.

20. The GNSS receiver of claim 17, further configured to estimate, after the classification of the signal data as being of the particular type of environment, a value for one or more additional types of input parameters of the plurality of different types of input parameters.

\* \* \* \* \*